Aug. 16, 1927.
C. L. MOORMAN
1,639,306
BRAKE MECHANISM FOR RAILWAY CARS
Filed Jan. 29, 1926     2 Sheets-Sheet 2
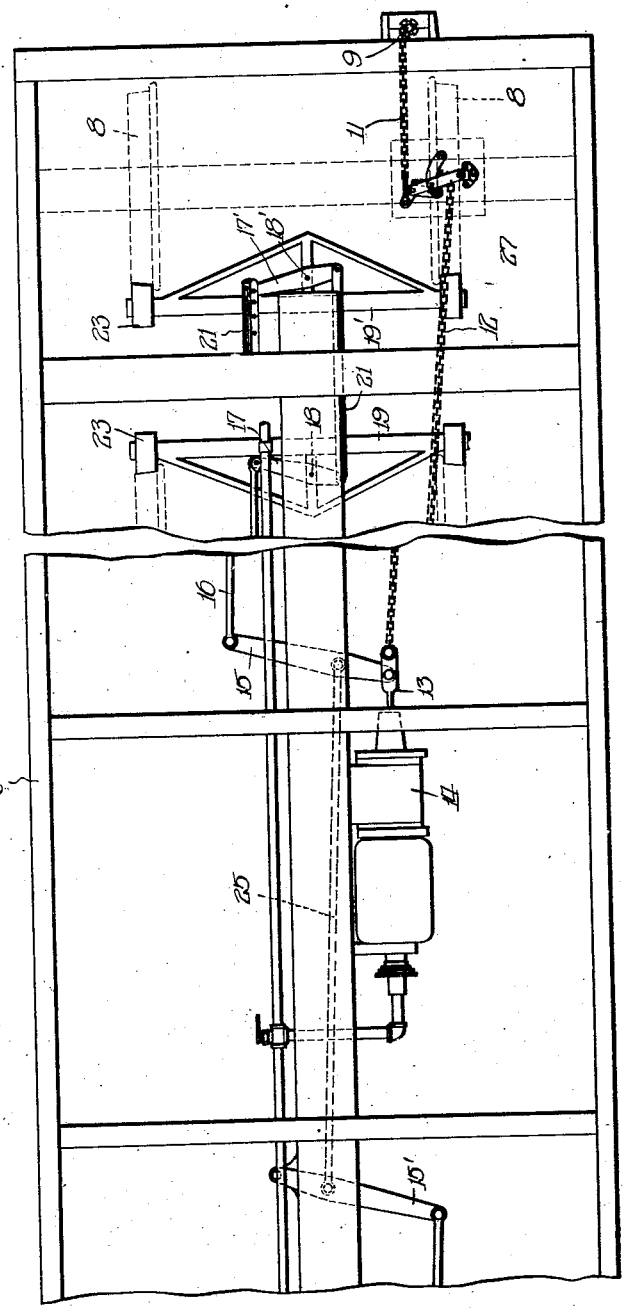
Inventor:
Charles L. Moorman, Patented Aug. 16, 1927.

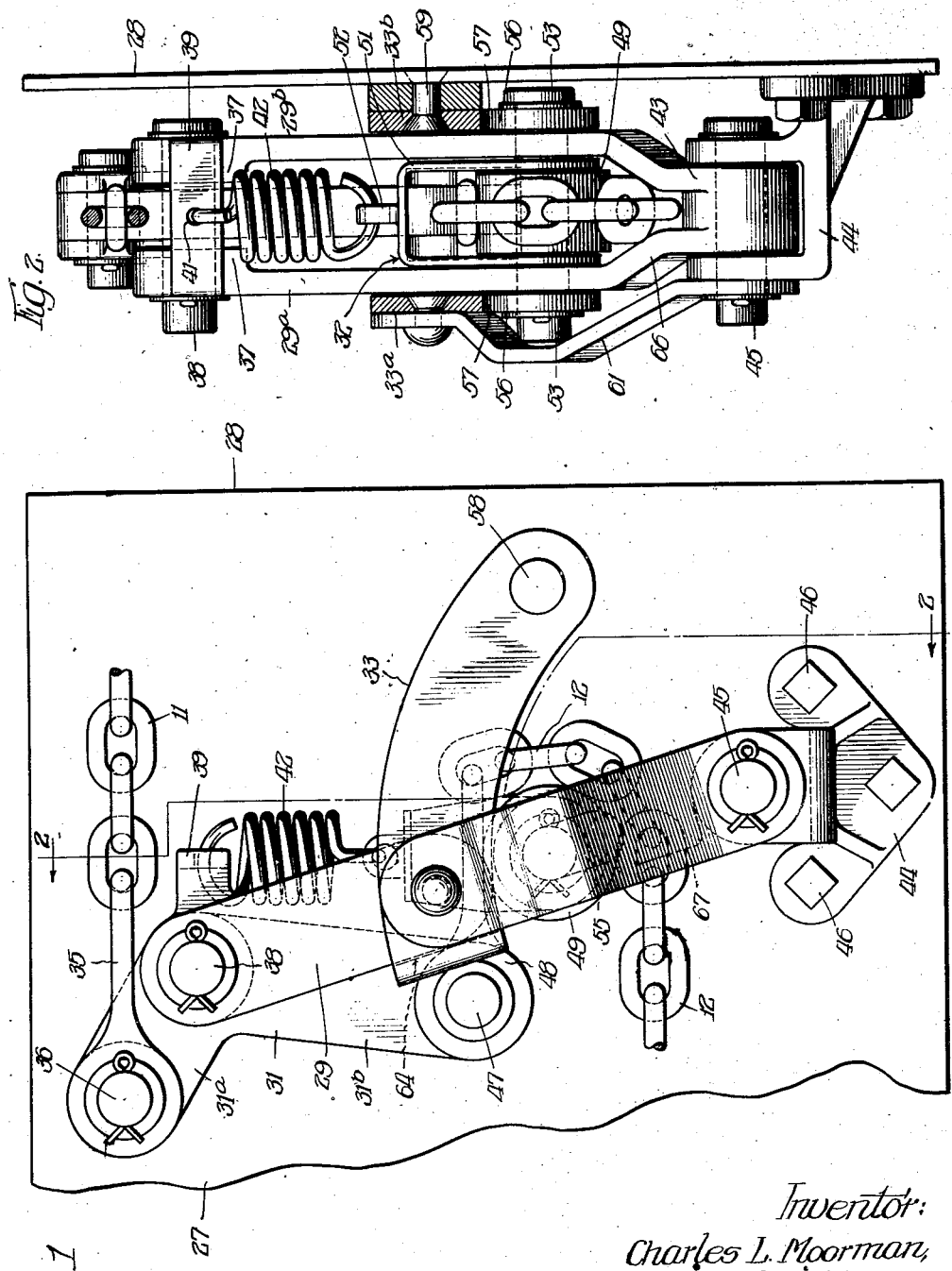

1,639,306

UNITED STATES PATENT OFFICE.

CHARLES L. MOORMAN, OF CHICAGO, ILLINOIS.

BRAKE MECHANISM FOR RAILWAY CARS.

Application filed January 29, 1926. Serial No. 84,538.

The present invention relates to brake mechanism for railway cars.

In the ordinary brake system employed on railway cars, there is always considerable slack in the various linked connections, and in the spacing of the brake shoes from the wheels, which, in the operation of the hand brake must be taken up by several rotations of the brake staff before the brakes can become effective. It is desirable to take up this slack with a relatively rapid motion to permit quick setting of the brakes, but at the same time it is practically imperative that the final setting of the brakes be through a mechanical advantage which will apply the necessary braking effort to the wheels.

It has been proposed heretofore to use braking mechanism—effective on the hand brake portion of the system—which will give a changing ratio of leverage for taking up the slack with a relatively rapid motion of low mechanical advantage, and for actually pressing the brake shoes against the wheels with a slower motion of high mechanical advantage. These prior constructions, however, have operated upon the theory of changing the leverage ratios with the degree of movement of the operating parts, irrespective of when the brake shoes actually engage the brake wheels. As a consequence, the brake shoes might be engaging the wheels when the system was operating under low mechanical advantage, or they might not engage the wheels until after the system had operated through a considerable part of its slow motion high mechanical advantage travel.

It is the fundamental object of the present invention to improve on these prior systems by providing brake mechanism which utilizes the re-action pressure of the brake shoes engaging the wheels to effect the shifting of leverage ratios, rather than utilizing the distance through which the operating parts have moved for determining the point where the leverage ratios are changed or shifted.

It is a further object of the invention to provide brake mechanism which will effect this shifting of leverage ratios with a quick, decided motion as soon as the re-action pressure on the operating parts indicates that the brake shoes are all in firm contact with their respective wheels.

It is a further object of the invention to provide brake mechanism of this general type in which the mechanism will be positively locked in its high leverage ratio when the maximum braking effort is being applied to the wheels.

Other objects and advantages of my invention will appear from the following detailed description of a preferred embodiment thereof. While, in this description, I have described the present braking mechanism as having its principal field of utility in connection with the manually operating end of a railway-car brake mechanism it will be apparent that it may be employed in connection with the pneumatically operating part of the system with equal advantage; and it will also be apparent that the essential features and characteristics of the invention can be embodied in brake systems for automobiles and other vehicles.

In the drawings accompanying this detailed description:

Figure 1 is a bottom plan view of the leverage changing or brake boosting mechanism.

Figure 2 is a side view thereof taken generally on the plane of the line 2—2 of Figure 1; and Figure 3 is a plan view of the frame of a typical railway car to which my invention may be applied.

Referring first to Figure 3, the car frame is designated 6 in its entirety, this car frame being of any conventional construction. The frame is supported on the usual end trucks having wheels 8—8. A brake staff 9 rises from one end of the car having suitable bearing support adjacent its upper and lower ends and carrying the usual hand wheel at its upper end, through which the brake mechanism is actuated in the manual operation thereof. This brake staff may, in the broader aspects of the invention, be considered as the equivalent of any source of braking energy.

Winding around this brake staff, or around a drum thereon is a first tension member or chain 11, which in lieu of a chain, may consist of a cable, or a rod with a section of chain or cable on the end thereof for winding on the brake staff. A second tension member, represented by the chain 12, leads to the system of linkage which operates the brake shoes. This system of brake operating linkage may be of any construction and assembly, the arrangement shown in Figure 3 being typical. In this arrangement, the end of the second tension member or chain 12 connects to the end of the piston rod 13 extending from the air brake cylinder 14. This piston rod in turn has pivotal connection with a floating lever 15, the opposite end of which has pivotal connection to a link 16. This link has pivotal connection to truck lever 17 which is pivoted intermediate its ends at 18 to one of the brake beams 19. The other end of this truck lever has pivotal connection through a link or rod 21 with one end of the other truck lever 17'. This latter truck lever has like pivotal connection at 18' to the other brake beam 19'. The opposite end of this second truck lever 17' is adapted to have adjustable pivotal anchorage in a bracket 21 secured to the car frame. The ends of the brake beams 19—19' carry brake shoes 23 which are adapted to bear against the wheels 8. Braking motion is transmitted to the brake shoes of the other truck through a rod 25 which forms the floating pivot for the lever 15. Tension applied to this rod actuates the brakes for the other truck through the lever 15' and a system of linkage similar to that just described.

The brake boosting or variable ratio mechanism constituting the subject matter of the present invention is designated 27 in its entirety, and is interposed between the first tension member 11 which leads from the brake staff 9 and the second tension member 12 which leads to the system of brake linkage. This brake boosting mechanism is mounted on a base plate 28 which is suitably bolted to the underside of the car. The principal elements of this device comprise a main swinging arm or lever 29, a secondary lever 31 in the form of a bell crank pivotally mounted on the outer end of the aforesaid main lever, a locking slide 32 movably supported on the main lever, and stationary cam means 33 for camming the slide 32 in along the main lever.

The first tension member or operating chain 11 connects to a clevis 35 having pivot eyes which engage on opposite sides of the short arm 31$^a$ of the bell crank lever 31, a pivot pin 36 extending through the eyes of the clevis and the end of the bell crank lever.

The main lever 29 is of forked construction comprising two parallel arms 29$^a$ and 29$^b$. The bell crank lever 31 is pivotally supported between pivot hubs 37 on the outer ends of the arms 29$^a$—29$^b$, a pivot pin 38 passing through these pivot hubs and through the bell crank lever. A cross web or bridge 39 joins the two arms 29$^a$—29$^b$ on one side of the main lever, this web having an aperture 41 therein into which hooks one end of a tension spring 42 which connects at its other end to the slide 32, as I shall presently describe.

The two arms of the main lever 29 merge into a common pivot hub 43 which engages between the arms of a forked pivot bracket 44, a pivot pin 45 passing through the arms of the pivot bracket and through the pivot hub 43. The pivot bracket 44 is suitably fixed to the mounting plate or base 28 by fastening bolts 46.

Referring again to the secondary or bell crank lever 31, the other arm 31$^b$ thereof has pivotal connection at 47 with a clevis 48 which extends inwardly between the arms of the main lever 29 and is linked to the end of the second operating chain or tension member 12. This operating chain passes around a roller 49 and thence back out between the spaced arms 29$^a$—29$^b$ of the main lever 29.

The roller 49 is carried by the slide 32, which slide is mounted for reciprocal motion between the arms 29$^a$—29$^b$ of the main lever 29. This slide preferably comprises a U-shaped stirrup 51 lying between the spaced arms of the main lever and having an eye 52 at its upper end to which the other end of the tension spring 42 is connected. The forked ends of this stirrup member have apertures therein through which passes a pivot pin 53, the roller 49 being rotatably mounted on this pivot pin between the sides of the stirrup. The ends of this pivot pin 53 extend outwardly through slots 55 in the side arms 29$^a$—29$^b$ of the main lever, these slots serving to guide the motion of the slide in a path extending substantially longitudinally of the main lever 29. Rollers 56 are mounted on the projecting ends of this pin on the outer sides of the arms 29$^a$—29$^b$, the pin having a shouldered end, and a cotter pin or other equivalent means to hold the rollers on this pin. The cam means 33 comprises two cam bars 33$^a$ and 33$^b$ which are disposed on the upper and lower sides of the main lever 29, this main lever having swinging movement between these cam bars. The rollers 56—56 bear against curved cam surfaces 57 defined along the inner edges of these cam bars.

At one end, these two cam bars are fixed to a stud 58 rising from the base plate 28, the two bars being held in spaced relation on this stud to permit the swinging movement of the main lever therebetween. The opposite end of the inner or upper cam bar 33$^b$ is riveted or otherwise secured to the base plate 28 as indicated at 59. The corresponding end of the other cam bar 33$^a$ is supported by an arched brace 61 which is riveted to one end of the bar and which is supported at its other end on the pivot pin 45.

In the construction shown the cam surfaces 57 are curved on arcs lying in eccentric relation to the pivot 45, (a relatively pronounced cam slope on these inner surfaces 57 being contemplated as an alternative construction) whereby as the main lever or arm 29 swings to the right as indicated by the arrow x, the rollers 56, and thereby the slide 32, will be cammed inwardly along this main lever toward the pivot 45. The tension of the spring 42 resists this inward movement of the slide, and when the braking tension is taken off the main lever, this tension spring by exerting a cam re-acting force on the rollers 56—56 will swing the main lever 29 back to its normal position. This normal position is defined by the stops 64 against which the main lever is normally held by the tension of the spring 42 acting through the rollers 56. These stops consist of small flanges turned inwardly from the ends of the cam bars 33ª and 33ᵇ and adapted to be engaged by the left hand edge of the main lever 29.

Where the two side arms 29ª—29ᵇ of the main lever converge to the pivot hub 43, they define a V-shaped portion 66 which has locking webs or shoulders 67 forming a locking slot therebetween. This locking slot is adapted to effect locking engagement with the second chain 12 when the movement of the slide 32 forces this chain down toward the pivot 45. This slot is just of sufficient width to receive one of the links lying in the plane of the slot, the engagement of the next adjacent link with the edges of this slot positively locking the chain to the lever.

In the operation of the device, the winding of the first chain 11 on the brake staff 9, will rock the bell crank lever 31 around its pivot 38, which in turn will exert tension on the second chain 12 pulling the same around the locking roller 49. It will be noted that the second arm 31ᵇ of this bell crank lever is longer than the first arm 31ª whereby an increased rate of movement is transmitted to the second chain 12, this leverage ratio giving rapid movement for taking up slack but having minimum mechanical advantage. The tension of the spring 42 is so proportioned that throughout the entire operation of taking up slack from the braking system, the main lever 29 will be held in the position illustrated in Figure 1. In this position the locking roller 39 is removed from proximity to the locking slot and the second chain has free passage between the arms of the main lever.

As soon as all of the slack has been taken up and the several brake shoes engage their respective wheels, a high re-action tension will be set up in the second chain 12, and also in the first chain 11. This will overcome the tension of the spring 42, resulting in the main lever 29 being drawn back in the direction of pull of the first chain or tension member 11. In this backward movement of the main lever, the slide 32 and locking roller 49 will be forced inwardly toward the pivot 45 with a relatively rapid motion, thereby locking one of the links of the secondary chain in the locking slot and positively locking this chain to the main lever. Thereafter continued swinging movement of the main lever will transmit a pull to the secondary chain 12 through the comparative short radius arm extending from the pivot 45 to the locking slot 67. Simultaneously therewith, the first chain 11 will be exerting its pull on the main lever through a radius arm extending from the pivot 45 out to the pivot pin 36 of the bell crank lever. Obviously, this preponderating ratio of leverage will give a tremendously increased mechanical advantage over the leverage ratios previously existing while slack was being taken out of the system, thereby permitting maximum braking effort to be exerted between the brake shoes and the wheels.

When the brake staff 9 is rotated in the opposite direction to release the brakes, the tension on the first chain 11 will be released, thereby permitting the tension of the spring 42 to come into effect and throw the main lever back to normal position and to restore all parts to normal position as the chain 11 is unwound.

As previously remarked, some of the features of my invention have wider application than to the specific use on the hand brake portion of a railway car braking system, and I intend that certain of the following claims be so construed. Moreover, the invention is capable of considerable modification and re-arrangement of parts without departing from the essence thereof.

I claim:

1. In brake mechanism for railway cars, the combination of brake shoes adapted to engage the car wheels, operating linkage for said brake shoes, a brake staff, a first tension member leading from said brake staff, a second tension member leading to said operating linkage, a main lever, a secondary lever pivoted on said main lever, said tension members being connected to said secondary lever for one ratio of motion transmitting leverage between said tension members, and means responsive to the re-action pressure in one of said tension members for locking one of said tension members to said main lever to establish a different ratio of motion transmitting leverage between said tension members.

2. In brake mechanism for railway cars, the combination of brakes cooperating with the car wheels, operating linkage for said brakes, a brake staff, a first tension member leading from said brake staff, a second tension member extending to said operating linkage, a main lever, a second lever pivoted on said main lever, said tension members being connected to said secondary lever, whereby said secondary lever transmits operating movement between said tension members while the slack is being taken out of the operating linkage, and means responsive to the re-action pressure of said brakes engaging the wheels for locking one of said tension members to said main lever to establish a different ratio of motion transmitting leverage between said tension members.

3. In brake mechanism for railway cars, the combination of brake shoes adapted to engage the car wheels, operating linkage for said brake shoes, a brake staff, a first tension member leading from said brake staff, a second tension member extending to said operating linkage, and brake boosting mechanism comprising a main lever, a secondary lever pivoted on said main lever, said tension member being connected to said secondary lever whereby said latter lever transmits operating movement between said tension members while the slack is being taken out of said operating linkage, and spring controlled locking mechanism responsive to the re-action pressure incident in the brake shoes engaging said wheels for locking one of said tension members to said main lever to establish a different ratio of motion transmitting leverage between said tension members.

4. In brake mechanism for railway cars, the combination of brakes adapted to effect braking engagement with the car wheels, operating linkage for said brakes, a brake staff, a first tension member leading from said brake staff, a second tension member extending to said operating linkage, a main lever, a secondary lever pivoted on said main lever, said tension members being connected to said secondary lever for one ratio of motion transmitting leverage between said tension members while the slack is being taken out of said operating linkage, locking means associated with said main lever, and spring means overcome by the re-action pressure of said brakes engaging the wheels for placing said tension member and said locking means in locking engagement.

5. In brake mechanism for railway cars, the combination of brakes adapted to apply a braking retardation to the car wheels, operating linkage for said brakes, a brake staff, a first tension member leading from said brake staff, a second tension member extending to said operating linkage, and brake boosting mechanism comprising a main lever, a secondary lever pivoted on said main lever, said tension members being connected to said secondary lever for one ratio of motion transmitting leverage between said tension members while the slack is being taken out of the said operating linkage, and spring controlled mechanism cooperating with said main lever whereby said main lever transmits motion between said tension members through a different ratio of leverage after said brakes begin to exert their braking retardation on said wheels.

6. In brake mechanism for railway cars, the combination of brakes adapted to exert braking retardation on the car wheels, operating linkage for said brakes, a brake staff, a first tension member leading from said brake staff, a second tension member extending to said operating linkage, a main lever, a secondary lever pivoted on said main lever, said tension member being connected to said secondary lever, said secondary lever transmitting by its pivotal movement one ratio of leverage between said tension members and means for restraining pivotal movement of said main lever until said brakes begin to apply braking retardation to said wheels, said main lever thereafter transmitting by its pivotal movement a different ratio of leverage between said tension members.

7. In brake mechanism for railway cars, the combination of brake shoes adapted to engage the car wheels, operating linkage for said brake shoes, a brake staff, a first tension member leading from said brake staff, a second tension member extending to said operating linkage, and brake boosting mechanism comprising a main lever, a secondary lever pivoted on said main lever, said tension members being connected to said secondary lever and one ratio of motion transmitting leverage between said tension members, spring means normally tending to hold said main lever against pivotal movement, and means for locking one of said tension members to said main lever when the re-action pressure in the braking system overcomes said spring means.

8. The combination with brake mechanism for railway cars, having brake shoes operating linkage therefor and a brake staff, of brake boosting mechanism comprising a main lever, a second lever pivotally supported on said main lever, the ends of said secondary lever being connected to tension members extending to said brake staff and its said operating linkage, said secondary lever by its pivotal movement on said main lever transmitting one ratio of leverage between said tension members, and means responsive to the re-action pressure in the braking system for locking one of said tension members to said main lever whereby pivotal movement of said main lever transmits a different ratio of motion transmitting leverage between said tension members.

9. In brake actuating mechanism of the class described, the combination of a main lever, a secondary lever pivotally supported on said main lever, the ends of said secondary lever being adapted to connect to the tension members of the brake system, said secondary lever transmitting operating movement between said tension members while slack is being taken out of the system, and spring means associated with said main lever and responsive to the reaction pressure of the brakes for locking one of the tension members to said main lever.

10. In brake mechanism of the class described, the combination of a main lever, a bell crank lever pivotally supported on said main lever, said bell crank lever being adapted to have its ends connected to tension members leading to the brake staff, and to the operating linkage, spring means normally tending to hold said main lever against pivotal movement, and means for positively locking said main lever to one of the tension members when the re-action pressure of the brakes overcome said spring means.

11. In brake mechanism of the class described, the combination of a main lever comprising two spaced arms, a bell crank lever pivoted between the outer ends of said arms, said bell crank lever being adapted to have its ends connected to the tension members leading to the brake staff and to the operating linkage, a slide movably supported between the arms of said main lever, a locking roller carried by said slide around which passes the tension member leading to the operating linkage, a stationary cam surface, a cam roller cooperating therewith carried by said slide, spring means connected to said slide and by its pressure transmitted through said cam roller to said cam surface normally tending to hold said main lever against pivotal movement, and a locking shoulder on said main lever adapted to effect locking engagement with the tension member extending to the operating linkage when said main lever is moved pivotally.

12. In brake mechanism of the class described, the combination of a main lever comprising a pair of spaced arms, a bell crank lever pivotally supported between the outer ends of said arm, one end of said bell crank lever being adapted to be connected to a first chain leading to the brake staff, the other end of said bell crank lever being adapted to be connected to a second chain leading to the operating linkage, a slide reciprocably mounted between the arms of said main lever, a roller carried by said slide and around which said second chain is adapted to pass, a cam element and a roller element cooperating therewith, one of said elements having fixed mounting relative to said main lever and the other of said elements being carried by said slide, a spring connected to said slide and operative through the re-action pressure exerted between said elements to normally hold said main lever against pivotal movement, and a locking recess into which said second chain is adapted to be forced upon the reaction pressure of the brake mechanism overcoming said spring.

In witness whereof, I hereunto subscribe my name this 11th day of January, 1926.

CHARLES L. MOORMAN.